US006452129B1

(12) United States Patent
Zhu et al.

(10) Patent No.: US 6,452,129 B1
(45) Date of Patent: Sep. 17, 2002

(54) PLASMA TORCH PREVENTING GAS BACKFLOWS INTO THE TORCH

(75) Inventors: Wenxian Zhu, San Jose; Richard C. Eschenbach, Ukiah; Robin A. Lampson, Ukiah; John R. Sparkes, Ukiah, all of CA (US)

(73) Assignee: Retech Systems LLC, Ukiah, CA (US)

( * ) Notice: Subject to any disclaimer, the term of this patent is extended or adjusted under 35 U.S.C. 154(b) by 0 days.

(21) Appl. No.: 09/717,487

(22) Filed: Nov. 20, 2000

Related U.S. Application Data

(60) Provisional application No. 60/167,211, filed on Nov. 24, 1999.

(51) Int. Cl.[7] .......... B23K 10/00

(52) U.S. Cl. .......... 219/121.5; 219/75; 219/121.51; 313/231.51

(58) Field of Search .......... 219/121.51, 121.5, 219/121.52, 75, 121.48, 121.59; 313/231.31, 231.51

(56) References Cited

U.S. PATENT DOCUMENTS 3,823,302 A * 7/1974 Muehlberger .......... 219/121.51
4,865,252 A * 9/1989 Rotolico et al. ....... 219/121.48
5,239,162 A * 8/1993 Haun et al. ............ 219/121.52
5,451,740 A * 9/1995 Hanus et al. .......... 219/121.59

* cited by examiner

*Primary Examiner*—Mark Paschall
(74) *Attorney, Agent, or Firm*—Townsend and Townsend and Crew

(57) ABSTRACT

A plasma arc torch is disclosed which has an elongated electrode with an open front and a nozzle with a plasma discharge opening that is coaxial with the electrode. A mounting arrangement includes a ceramic ring that engages the front end of the electrode and a gas ring which concentrically surrounds the ceramic ring. A forward portion of the gas ring, the forward end of the electrode, and the nozzle define a swirl chamber of the torch, and opposing, spaced-apart concentric cylindrical surfaces of the ceramic ring and the gas ring, respectively, form an annulus which extends rearwardly from the swirl chamber. The ceramic ring closes the aft end of the annulus, and the gas ring houses a plurality of plasma gas injection ports which are located immediately forward of the aft end of the annulus. The entire plasma gas for the torch flows from the injection ports generally tangentially into the annulus to prevent a recirculation of gas into the annulus and to impart rotation to the gas after it leaves the ports and as it propagates towards the swirl chamber. The annulus is sufficiently long so that the injected gas spirals through about 5–20 revolutions before it enters the swirl chamber as a substantially uniform, single mass gas flow.

17 Claims, 2 Drawing Sheets

PLASMA TORCH PREVENTING GAS BACKFLOWS INTO THE TORCH

This application claims benefit of provisional application No. 60/167,211, filed Nov. 24, 1999.

BACKGROUND OF THE INVENTION

The present invention relates to plasma arc torches ("plasma torches") as used in furnace melting, for example.

One type of plasma torch employs a cylindrical electrode with a center bore; a gas-constricting nozzle at and spaced from a front end of the electrode; a so-called "swirl chamber" which surrounds the space between the electrode and the nozzle; and an arrangement for generating a vortical flow of pressurized gas which flows from the swirl chamber back into the electrode bore and swirls forwardly through the discharge opening of the nozzle.

A plasma torch develops heat with an arc which is drawn between the electrode and the workpiece (called the transferred mode). Alternatively, heat may be developed between a torch electrode and a second electrode (called non-transferred mode). The transferred mode is usually more efficient for heating conductive solids and/or liquids because energy transfers directly from the torch to the workpiece, rather than partially dissipating to a separate electrode, and the present invention is especially concerned with transferred mode torches.

When an arc is struck between the electrode and a workpiece outside of the nozzle, the gas carrying the arc current becomes ionized, thereby forming a plasma which is expelled through a constricting discharge opening of the nozzle as a swirling, superheated plasma jet that melts the workpiece. The swirling gas also helps to protect the electrode from erosion or contamination because the point on the electrode from which the arc emanates (arc termination point) tends to spin with the arc gas instead of remaining stationary.

U.S. Pat. No. 5,239,162, the disclosure of which is incorporated herein by reference, discloses an improved plasma arc torch and illustrates, in FIG. 3 thereof (which is reproduced herein), a swirl chamber principally formed between the front end of the electrode and the torch nozzle. FIG. 3 of the patent illustrates, as is conventional, locating a plurality of primary (plasma) gas discharge ports so that they direct a plurality of individual gas flows generally tangentially into the swirl chamber to rotate or spin the gas as it flows from the swirl chamber through the torch and the discharge opening of the nozzle towards the workpiece that is to be melted. Typically, such torches include an annular space (not shown in U.S. Pat. No. 5,239,162) which is concentric with the electrode and extends from the front end thereof in an aft direction. The aft end of the annulus is closed, located some distance from the front end of the electrode, and includes secondary gas discharge ports which may be located adjacent the aft end or at intermediate positions along the annulus and direct individual gas flows into the annulus and towards the swirl chamber. Gas from the secondary discharge ports combines with the gas from the primary ports and smoothes the vortical flow, which in turn improves the operation of the torch.

While in the swirl chamber, the gas flows from the discharge ports spin at a relatively high rate and create a vortex flow into the nozzle discharge opening as well as a pressure gradient in which the pressure is largest at the outer boundary of the rotating gas flow and decreases towards the rotational center. A corresponding radial pressure gradient is also present inside the annulus just above the swirl chamber so that the pressure in the annulus along its outer diameter is slightly larger than the pressure along the inner diameter of the annulus.

Such torches worked well for their traditional applications, the melting of metals. Recently, plasma torch furnaces using transferred mode plasma torches have been used for heating and melting materials in several other industries, including the treatment (melting and/or incineration) of waste. Transferred mode plasma torches use relatively lesser gas flow rates (as compared to non-transferred mode plasma torches), and during heating and melting of waste materials severe abrasion was encountered from particles which were drawn by the low pressure near the axis of the swirling gas into the swirl chamber, where centrifugal forces gyrate them radially outward towards the outer wall of the swirl chamber. Particles in past torches were also drawn along the outside wall into the annulus above the swirl chamber, apparently because a fraction of the gas from the secondary discharge ports recirculated back into the annulus. Centrifugal forces of the gas spinning in the annulus forced the particles radially outward against the outer wall of the annulus and caused extensive abrasion along the outer annulus wall. The problem is so severe that the affected components of the torch, especially what is commonly referred to as the gas ring, may become unusable and require replacement after as little as 10–30 service hours.

Replacing the gas ring is time-consuming because the furnace and the plasma torch must first be cooled down. Only thereafter can the worn gas ring (and any other worn parts of the torch) be replaced. The frequent replacement of the gas ring is costly. In addition, each time the gas ring must be replaced the furnace experiences a prolonged downtime, which significantly reduces the efficiency of the furnace and further increases costs.

SUMMARY OF THE INVENTION

The present invention overcomes the above-described problems encountered with prior art plasma torches by eliminating all (plasma) gas discharge ports in the swirl chamber of the torch, that is, forward of the annulus above the swirl chamber. Instead, all gas injection ports are located (preferably in a single plane that is perpendicular to the annulus) just forward or short of the closed aft end of the annulus surrounding the electrode. This generates a relatively large, positive pressure gradient from the aft end to the forward end of the annulus and induces a positive forward gas flow over substantially the entire cross-section of the annulus, thereby preventing the heretofore encountered backflow of gas which could carry abrading particles into the annulus. Thus, the present invention prevents the particles from entering the annulus in the first place. In addition, any particles that may have entered the annulus are positively moved out of it towards the swirl chamber. As a result, gas ring erosion from spinning particles is reduced to such an extent that instead of the heretofore typical 10–30 hour service life, gas ring service life is increased by a factor of 10 or more. This significantly reduces replacement costs and the frequency of costly furnace downtimes.

Generally speaking, therefore, the present invention provides a swirl flow plasma arc torch which has an elongated electrode with an open front end and a nozzle with a plasma discharge opening that is coaxial with the electrode. In the preferred embodiment, a mounting arrangement for the electrode includes a ceramic ring at the front end of the electrode and a gas ring which concentrically surrounds the ceramic ring. A forward portion of the gas ring, the forward end of the electrode, and the nozzle define the swirl chamber of the torch, and opposing, spaced-apart concentric cylindrical surfaces of the ceramic ring and the gas ring, respectively, form the annulus which extends rearwardly from the swirl chamber. The ceramic ring closes the aft end of the annulus, and the gas ring houses a plurality, typically 4 to 8, of plasma gas injection ports which preferably lie in a single plane located immediately forward of the aft end of the annulus.

In use, gas is directed from the injection ports generally tangentially near the rear of the annulus to impart rotation to the gas after it leaves the ports and as it flows toward the swirl chamber. Best results are obtained when the plasma torch establishes a uniform, swirling plasma gas flow in the swirl chamber and the nozzle discharge opening. This is attained by making the annulus sufficiently long so that the injected gas performs between 5–20 revolutions as it spirals forwardly before it enters the swirl chamber as a uniform, single mass gas flow.

Due to the absence of any appreciable number of particles in the annulus, and their prompt expulsion therefrom should they enter, abrasion of the gas ring is greatly reduced, its service life is correspondingly lengthened, and the frequency of costly furnace downtimes to change gas rings is significantly lowered. Accordingly, the present invention substantially improves the economics of operating furnaces heated by plasma torch.

DESCRIPTION OF THE PREFERRED EMBODIMENTS

Figure 1:
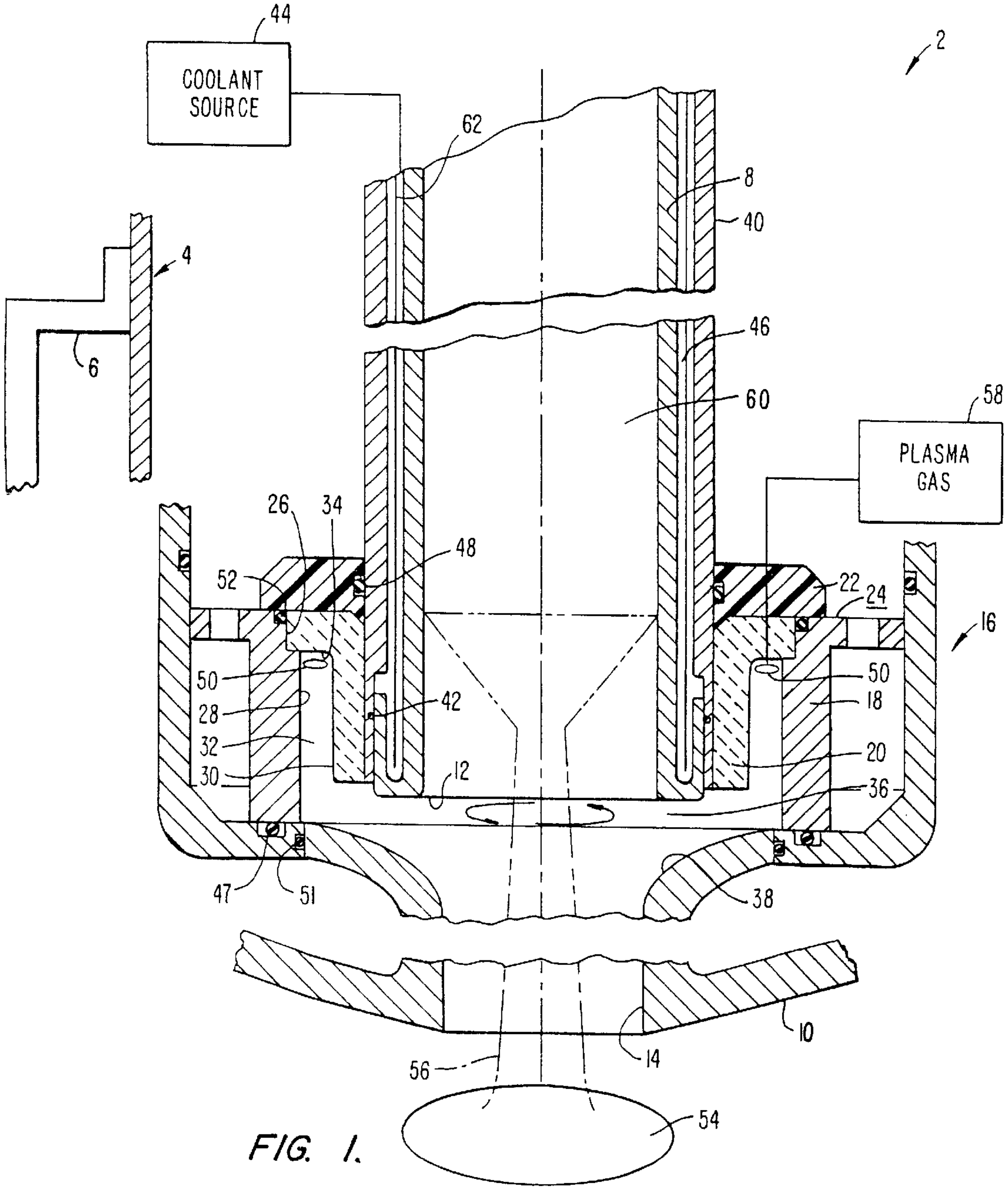
FIG. 1 is a fragmentary, side elevational view, in section, and illustrates a plasma arc torch constructed in accordance with the present invention.

Referring to FIG. 1, a plasma arc torch 2 constructed in accordance with the present invention is mounted on a schematically illustrated holder 4 within a schematically illustrated plasma arc furnace 6. The torch includes an electrode 8 and a nozzle 10 which is spaced apart from a front end 12 of the electrode and has a plasma discharge opening 14 that is concentric with the electrode. A mounting arrangement 16 forms a connection between the electrode and the nozzle. The mounting arrangement positions a flanged gas ring 18, a ceramic ring 20 (which may be L-shaped in cross-section), and a plastic, sealing plate 22 that is suitably pressed against a rearwardly oriented face 24 defined by the two rings, as is well known in the art. The details of constructing, assembling and installing such a torch in a furnace are well known and, therefore, not further described herein.

The gas ring may include a radial recess 26 at its aft end to receive and support the periphery of the flanged ceramic ring. A cylindrical, radially inwardly facing surface 28 of the gas ring is radially spaced apart from an opposing, cylindrical surface 30 of the ceramic ring, and the two surfaces form an annulus 32 which is concentric with the electrode. The flanged end of the ceramic ring forms a closed aft end 34 of the annulus. The forward end of the annulus is open and in fluid communication with a circular (in cross-section) swirl chamber 36 defined by and between front end 12 of the electrode and an outwardly diverging, curved rear end 38 of the nozzle so that it is in fluid communication with plasma discharge opening 14 of the nozzle.

As is conventional, the electrode is surrounded by a spaced-apart cooling tube 40 the forward end of which is suitably attached and sealed (e.g. with a schematically illustrated seal ring 42) to the electrode. Coolant, such as water, is circulated from a coolant source 44 through a cooling channel 46 defined by the electrode, the cooling tube, and a (schematically illustrated) baffle 62 between them. Further, sealing rings, such as O-rings 47, 48, 51 and 52, are appropriately positioned at interfaces between the ceramic flange periphery and the gas ring, between the plastic plate 22 and cooling tube 40, as well as elsewhere, to constrain the gas flow to the annulus and passages 49 and to prevent gas from escaping elsewhere, as is well known in the art and also generally illustrated in FIG. 1.

Figure 2:
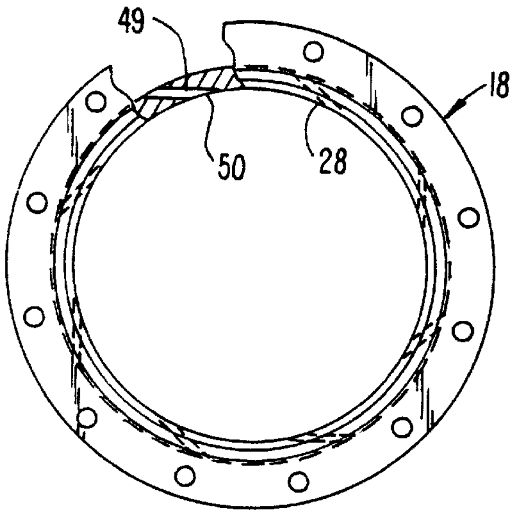
FIG. 2 is a plan view, partially in section, of a gas ring used in the plasma torch of FIG. 1.
Figure 3:
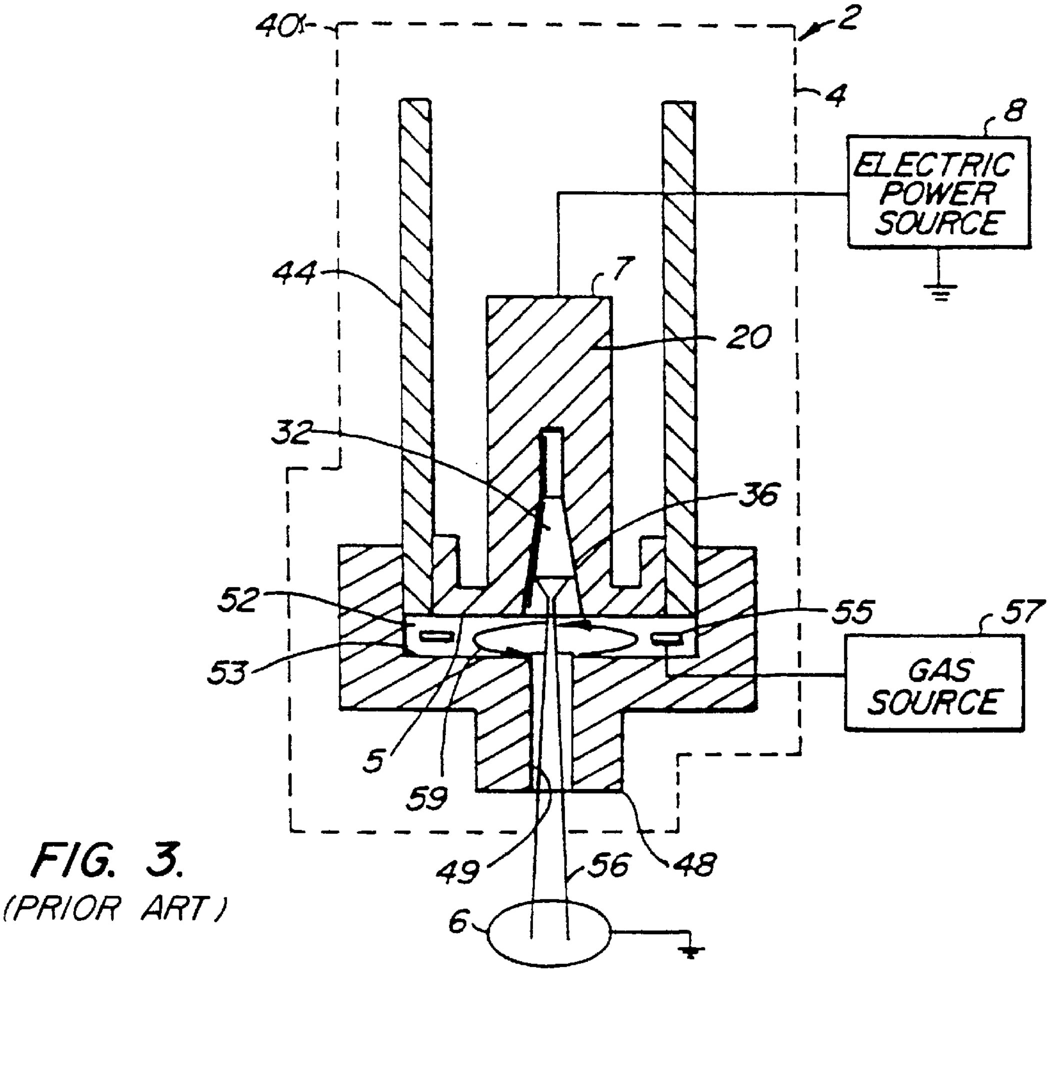
FIG. 3. (PRIOR ART)
FIG. 3 corresponds to FIG. 3 of U.S. Pat. No. 5,239,162.

Referring now to FIGS. 1 and 2, gas ring 18 includes a plurality, typically 4 to 8, of gas flow passages 49 which are tangentially drilled into it so that the resulting gas injection port 50 of each passage is located just below radial recess 26 proximate, that is just forward of, aft end 34 of annulus 32. The injection ports 50 are preferably arranged in a single plane, and the flow passages tangentially direct individual gas flows from the ports into the annulus so that the gas spirally advances forwardly towards the swirl chamber. It is presently preferred to arrange the ports and construct the annulus so that each individual gas flow spins between about 5–20 times before it arrives at the swirl chamber. This homogenizes the individual gas flows into a substantially uniform, rotating single mass of gas that enters the swirl chamber.

Turning now to the operation of the plasma torch, it is initially positioned so that it is above and appropriately spaced from a workpiece 54 that is to be melted. An electric potential is applied to electrode 8 and workpiece 54, and a schematically illustrated arc 56 is conventionally struck as is well known in the art. Plasma gas from a source 58 flows via passages 49 in gas ring 18 and through injection ports 50 into annulus 32. The pressure and gas flow rates are selected so that the individual injected gas flows become a homogeneous gas mass by the time the gas reaches swirl chamber 36. In a presently preferred embodiment, the ratio of the cross-sectional area of the annulus to the combined cross-sectional area of all gas injection ports should be at least 15 and preferably is 20 or more. In one preferred embodiment, in which the annulus has a mean diameter of about 3.7", a radial width of about 0.1", and a length of about 0.75", the ratio is 24. This assures sufficient revolutions by the individual gas flows injected into the annulus when the supplied gas has a pressure of about 15 psig, or greater, so that, when they arrive at the end of the annulus, they form a substantially uniform, spiraling gas mass which enters the swirl chamber.

Part of the gas swirling inwardly between the electrode and the nozzle flows into the electrode near the wall of the electrode, then leaves the electrode along and near its axis. Most of the gas swirling inwardly between the electrode and the nozzle flows outwardly directly through the nozzle. The axial velocity is most strongly outward near the wall of the nozzle, and is smaller (and sometimes slightly inward) at the axis of the nozzle.

The electric arc 56, one termination of which spins inside the electrode bore 60, is thus surrounded by a swirling flow of gas which becomes partially ionized as it is incorporated into the arc forming a hot plasma that is blown through nozzle discharge opening 14 towards workpiece 54 that is to be heated or melted. The workpiece forms the second termination of the arc.

As earlier described, the positive forward flow of gas from the aft end of the annulus into the swirl chamber prevents particles from entering the annulus in the first place, and any particles which do enter are promptly expelled from the annulus. Accordingly, the service life of the gas ring, and therewith of the overall torch, is greatly enhanced.

What is claimed is:

1. A swirl flow plasma arc torch comprising an elongated electrode having an open front end; a nozzle forming a plasma discharge opening which is coaxial with the electrode; a mounting arrangement for the electrode; the electrode, the nozzle and the mounting arrangement defining a swirl chamber between the electrode and the nozzle and an annulus concentrically surrounding the electrode and in fluid communication with the swirl chamber, the annulus terminating in a closed aft end which is spaced rearwardly from the front end of the electrode; and a plurality of plasma gas injection ports for directing a plurality of plasma gas flows into the annulus generally tangentially, all gas injection ports being located proximate the aft end of the annulus so that plasma gas from the ports spirally advances along the annulus and past the swirl chamber into the nozzle discharge opening, the annulus and the injection ports being positioned and dimensioned to prevent particulates entrained in plasma gas recirculating through the discharge opening towards the electrode and the annulus from reaching and abrading surfaces defining the annulus.

2. A plasma arc torch comprising an elongated electrode extending from a front end in an aft direction; a nozzle having a plasma discharge opening spaced from and coaxial with the electrode; a mounting arrangement forming an annulus in flow communication with the nozzle discharge opening and extending from about the front end of the electrode in the aft direction to a closed aft end of the annulus which is spaced from the front end of the electrode; and a plasma gas flow system operatively coupled with the mounting arrangement which generates a swirling plasma gas flow beginning at the closed aft end of the annulus and flowing out of the discharge opening, the plasma gas flow generating a pressure in the annulus proximate the aft end thereof which exceeds a pressure of the plasma gas flow at an end of the annulus proximate the forward end of the electrode and which is sufficient to substantially prevent plasma gas from recirculating into the annulus; the annulus having a length so that the gas flow spins at least about 5 times in the annulus before it arrives at the front end of the annulus.

3. A torch according to claim 2 wherein the mounting arrangement includes ports that lie in a single plane that is perpendicular to the annulus.

4. A torch according to claim 2 wherein the mounting arrangement comprises a ceramic ring surrounding the electrode, extending from the front end of the electrode in an aft direction, and defining a radially inner wall of the annulus.

5. A torch according to claim 2 wherein the mounting arrangement includes a gas ring concentrically surrounding and radially spaced from the electrode, extending from the front end of the electrode in an aft direction, defining a radially outer wall of the annulus, and including a plurality of spaced-apart passages which define gas injection ports.

6. A torch according to claim 5 wherein the gas ring is constructed of metal.

7. A torch according to claim 6 wherein the gas ring defines a radially outermost wall of the swirl chamber.

8. A torch according to claim 2 wherein the mounting arrangement includes a ceramic ring surrounding an outer surface of the electrode, extending from proximate the front end of the electrode in an aft direction and defining the aft end of the annulus; and a metallic gas ring operatively coupled with the ceramic ring, defining a radially outermost wall of the annulus, and forming injection ports proximate the aft end of the annulus for the gas flow.

9. A torch according to claim 8 wherein the gas ring and the ceramic ring terminate in an aft facing end face that is spaced apart from the closed aft end of the annulus, and including a plastic plate secured to the end face.

10. A torch according to claim 2 wherein the gas flow system comprises plasma gas injection ports located proximate the aft end of the annulus only.

11. A method of operating a plasma torch having an elongated electrode, a mounting arrangement forming an annulus which is concentric to the electrode and extends from a closed aft end of the annulus along the electrode to a front end of the electrode, and a nozzle operatively coupled with the mounting arrangement and the electrode and including a discharge opening which is concentric with the electrode, the method comprising the steps of generating an electric arc between the electrode and a workpiece spaced apart from the nozzle; supplying a plasma gas; spinning the entire plasma gas in and flowing it through the annulus, past the front end of the electrode, and out of the discharge opening of the nozzle so that the plasma gas surrounds the electric arc and, upon arrival of the plasma gas at the front end of the electrode, forms a substantially uniform, rotating mass of gas; and generating a pressure in the plasma gas flow proximate the closed aft end of the annulus which exceeds the pressure of the plasma gas at the front end of the electrode sufficiently to prevent a recirculation of plasma gas into the annulus and therewith prevent the migration of particulate matter into the annulus.

12. A method according to claim 11 wherein flowing the plasma gas comprises flowing the plasma gas from proximate the aft end of the annulus.

13. A method according to claim 12 including flowing the entire plasma gas through a plurality of injection ports in fluid communication with the annulus and located proximate the closed aft end of the annulus.

14. A method of operating a plasma torch having an elongated electrode, a mounting arrangement forming an annulus disposed about the electrode and extending from a front end of the electrode to a closed aft end of the annulus, and a nozzle operatively coupled with the mounting arrangement and the electrode and including a discharge opening, the method comprising flowing a plasma gas tangentially into the annulus proximate the closed aft end thereof so that the plasma gas spins in the annulus as it propagates from the aft end of the annulus towards the front end of the torch, retaining the gas in the annulus sufficiently long so that the gas spins in the annulus at least about 5 times before it reaches the front end of the electrode and a recirculation of gas and particulate matter entrained therein into the torch is prevented, thereafter flowing the gas out of the discharge opening of the nozzle, and striking an electric arc between the electrode and a workpiece spaced apart from the nozzle.

15. A method of operating a plasma torch having an elongated electrode, a mounting arrangement forming an annulus which is concentric to the electrode and extends from a front end of the electrode rearwardly to a closed aft end of the annulus, a nozzle operatively coupled with the mounting arrangement and the electrode and including a discharge opening, the method comprising flowing a plasma gas through at least one injection port into the annulus proximate the aft end thereof, providing the annulus with a sufficient length so that the gas flow forms a substantially uniform, rotating mass of gas when it arrives at the front end of the electrode, flowing plasma gas only through the discharge opening and out of the nozzle, and striking an arc between the electrode and a workpiece that is spaced apart from the nozzle, whereby particulate matter entrained in plasma gas recirculating through the discharge opening into the plasma torch is prevented from entering the annulus and abrading surfaces defining the annulus.

16. A method according to claim 15 wherein each of the annulus and the at least one gas injection port has a cross-sectional area, and dimensioning the annulus and the injection port so that the cross-sectional area of the annulus is at least about 15 times the cross-sectional area of the at least one injection port.

17. A method according to claim 16 wherein the cross-sectional area of the annulus is more than 20 times the cross-sectional area of the at least one injection port.

* * * * *